US011877037B2

(12) United States Patent
Wachob

(10) Patent No.: US 11,877,037 B2
(45) Date of Patent: *Jan. 16, 2024

(54) DISTRIBUTED ACCESS ARCHITECTURE SYSTEM FOR CATV

(71) Applicant: Antronix, Inc., Cranbury, NJ (US)

(72) Inventor: David E. Wachob, New Hope, PA (US)

(73) Assignee: ANTRONIX, INC.

(*) Notice: Subject to any disclaimer, the term of this patent is extended or adjusted under 35 U.S.C. 154(b) by 0 days.

This patent is subject to a terminal disclaimer.

(21) Appl. No.: 18/105,036

(22) Filed: Feb. 2, 2023

(65) Prior Publication Data

US 2023/0188800 A1   Jun. 15, 2023

Related U.S. Application Data

(63) Continuation of application No. 17/970,946, filed on Oct. 21, 2022, which is a continuation of application (Continued)

(51) Int. Cl.
*H04N 21/61* (2011.01)
*H04N 21/647* (2011.01)
*H04N 21/226* (2011.01)

(52) U.S. Cl.
CPC ....... *H04N 21/6118* (2013.01); *H04N 21/226* (2013.01); *H04N 21/647* (2013.01)

(58) Field of Classification Search
CPC . H04N 21/6118; H04N 21/226; H04N 21/647
See application file for complete search history.

(56) References Cited

U.S. PATENT DOCUMENTS 5,136,411 A   8/1992   Paik et al.
5,841,468 A   11/1998   Wright
(Continued)

FOREIGN PATENT DOCUMENTS

EP         0882268       12/1998
WO       WO9727550       7/1997

OTHER PUBLICATIONS

US 9,525,853 B2, 12/2016, Wachob et al. (withdrawn)

*Primary Examiner* — James R Sheleheda
(74) *Attorney, Agent, or Firm* — The Belles Group, P.C.

(57) ABSTRACT

In one embodiment, a system includes a first device that receives, from a cable television (CATV) node, first downstream and upstream CATV RF signals and converts them to downstream and upstream optical signals. The first device distributes the downstream and upstream optical signals separately from each other by using different fiber optic cables or different wavelengths. The system further includes at least one micro distribution system, each comprising a micro node and at least one string of taps. The micro node receives the downstream and upstream optical signals from the first device and converts them to second downstream and upstream CATV RF signals. For each string of taps, the received second downstream and upstream CATV RF signals are passed from the micro node along the taps and blocked by a low pass filter (LPF), and the powering signal is passed along the taps and through the LPF.

20 Claims, 11 Drawing Sheets

Related U.S. Application Data

No. 17/124,656, filed on Dec. 17, 2020, now Pat. No. 11,509,971.

(60) Provisional application No. 62/974,730, filed on Dec. 19, 2019.

(56) References Cited

U.S. PATENT DOCUMENTS

| | | | |
|---|---|---|---|
| 6,373,611 B1 | 4/2002 | Farhan et al. | |
| 6,425,132 B1 | 7/2002 | Chappell | |
| 6,487,262 B1 | 11/2002 | Moulton et al. | |
| 6,577,414 B1 | 6/2003 | Feldman et al. | |
| 6,771,909 B2 | 8/2004 | Farhan et al. | |
| 6,990,682 B1 | 1/2006 | Sato et al. | |
| 7,209,497 B2 | 4/2007 | Weinstein et al. | |
| 8,050,562 B2 | 11/2011 | Lee et al. | |
| 8,132,222 B2 | 3/2012 | Phillips et al. | |
| 8,311,412 B2 | 11/2012 | Rakib | |
| 8,850,505 B2 | 9/2014 | Zilberberg | |
| 8,909,057 B2 | 12/2014 | Sun | |
| 9,461,738 B2 | 10/2016 | Rahman et al. | |
| 9,461,744 B2 | 10/2016 | Bowler et al. | |
| 9,554,194 B2 | 1/2017 | Wachob et al. | |
| 9,554,284 B2 | 1/2017 | Gejbrowitz et al. | |
| 9,635,309 B2 | 4/2017 | Bowler et al. | |
| 9,641,813 B2 | 5/2017 | Bowler et al. | |
| 9,900,634 B2 | 2/2018 | Bowler et al. | |
| 11,509,971 B2 * | 11/2022 | Wachob | H04N 21/647 |
| 2004/0203431 A1 | 10/2004 | Cooper | |
| 2005/0034167 A1 | 2/2005 | Weinstein et al. | |
| 2006/0101501 A1 | 5/2006 | Orbach et al. | |
| 2007/0212073 A1 | 9/2007 | Kikushima et al. | |
| 2008/0159744 A1 | 7/2008 | Soto et al. | |
| 2010/0150556 A1 | 6/2010 | Soto et al. | |
| 2012/0110631 A1 * | 5/2012 | Rakib | H04N 21/6118 725/127 |
| 2013/0279914 A1 | 10/2013 | Brooks | |
| 2013/0343761 A1 | 12/2013 | Fang et al. | |
| 2014/0314412 A1 | 10/2014 | Soto et al. | |
| 2014/0344874 A1 | 11/2014 | Olsen | |
| 2015/0026750 A1 | 1/2015 | Wachob et al. | |
| 2015/0067755 A1 | 3/2015 | Conroy et al. | |
| 2015/0078756 A1 | 3/2015 | Soto et al. | |
| 2017/0237506 A1 | 8/2017 | Soto et al. | |
| 2018/0109313 A1 | 4/2018 | Fargano et al. | |
| 2018/0109319 A1 * | 4/2018 | Jones | H04B 10/564 |
| 2020/0133370 A1 | 4/2020 | Bonen | |
| 2021/0075520 A1 | 3/2021 | Soto et al. | |
| 2021/0195297 A1 | 6/2021 | Wachob | |
| 2021/0258076 A1 * | 8/2021 | Magnezi | H04B 10/2575 |
| 2021/0314684 A1 | 10/2021 | Krapp et al. | |

\* cited by examiner

DISTRIBUTED ACCESS ARCHITECTURE SYSTEM FOR CATV

CROSS REFERENCE TO RELATED APPLICATIONS

The present application is a continuation of U.S. patent application Ser. No. 17/970,946, filed Oct. 21, 2022, which is a continuation of U.S. patent application Ser. No. 17/124,656, filed Dec. 17, 2020, which claims the benefit of U.S. Provisional Patent Application No. 62/974,730 filed Dec. 19, 2019. The disclosures of the foregoing priority applications are incorporated herein by reference in their entireties.

BACKGROUND

Cable television (CATV) system architectures have become increasingly complex in recent years, as both the technology sophistication and performance requirements have steadily increased in an effort to meet consumer demands for expanded data rates, better signal quality, and improved system reliability. CATV operators are also looking to improve their operational efficiencies in terms of deployment practices, and reduced network and headend power and space requirements. One approach to meeting these demands is referred to as Distributed Access Architecture. Current Distributed Access Architecture systems meet some of the foregoing demands by moving certain signal processing from the CATV headend to the CATV node. But further developments to Distributed Access Architecture are required to better meet consumer demands.

BRIEF SUMMARY

The present disclosure modifies conventional CATV system architectures to provide significant performance, cost, and operational advantages. It does so in an easily upgradeable fashion, thus minimizing customer and CATV operator disruption. The disclosure also provides for compatibility with both existing industry technology, as well as future industry technology initiatives to further enhance system capacity and performance.

The present disclosure may be directed, in one aspect, to a system comprising a first device configured to receive from a cable television (CATV) node first downstream and upstream CATV RF signals; convert the first downstream and upstream CATV RF signals to downstream optical signals and upstream optical signals, respectively; distribute the downstream optical signals separately from the upstream optical signals by using at least one of different fiber optic cables or different wavelengths; and at least one micro distribution system, each of the at least one micro distribution systems being independently operably coupled to the first device and comprising a micro node configured to receive the downstream and upstream optical signals, directly or indirectly, from the first device and to convert the downstream and upstream optical signals to second downstream and upstream CATV RF signals; and at least one string of taps operably coupled to the micro node and configured to receive the second downstream and upstream CATV RF signals from the micro node and to receive a powering signal, each of the at least one string of taps comprising taps terminated at an end of the string by a low pass filter (LPF); wherein, for each of the at least one string of taps, the received second downstream and upstream CATV RF signals are passed from the micro node along the taps and blocked by the LPF, and the powering signal is passed along the taps and through the LPF.

In another aspect, a method comprises at a first device, receiving from a CATV node first downstream and upstream CATV RF signals; converting, by the first device, the first downstream and upstream CATV RF signals to downstream optical signals and upstream optical signals, respectively; distributing, by the first device, the downstream optical signals separately from the upstream optical signals by using at least one of different fiber optic cables or different wavelengths; providing at least one micro distribution system, each of the at least one micro distribution systems being independently operably coupled to the first device and comprising a micro node and at least one string of taps operably coupled to the micro node, each of the at least one string of taps comprising taps terminated at an end of the string by a low pass filter (LPF); receiving, at the micro node, the downstream and upstream optical signals, directly or indirectly, from the first device and converting the downstream and upstream optical signals to second downstream and upstream CATV RF signals; receiving, at the at least one string of taps, the second downstream and upstream CATV RF signals from the micro node, and receiving a powering signal; and for each of the at least one string of taps: passing the received second downstream and upstream CATV RF signals from the micro node along the taps and blocking the second downstream and upstream CATV RF signals by the LPF; and passing the powering signal along the taps and through the LPF.

BRIEF DESCRIPTION OF THE DRAWINGS

The present disclosure will become more fully understood from the detailed description and the accompanying drawings, wherein.

DETAILED DESCRIPTION

Figure 1:
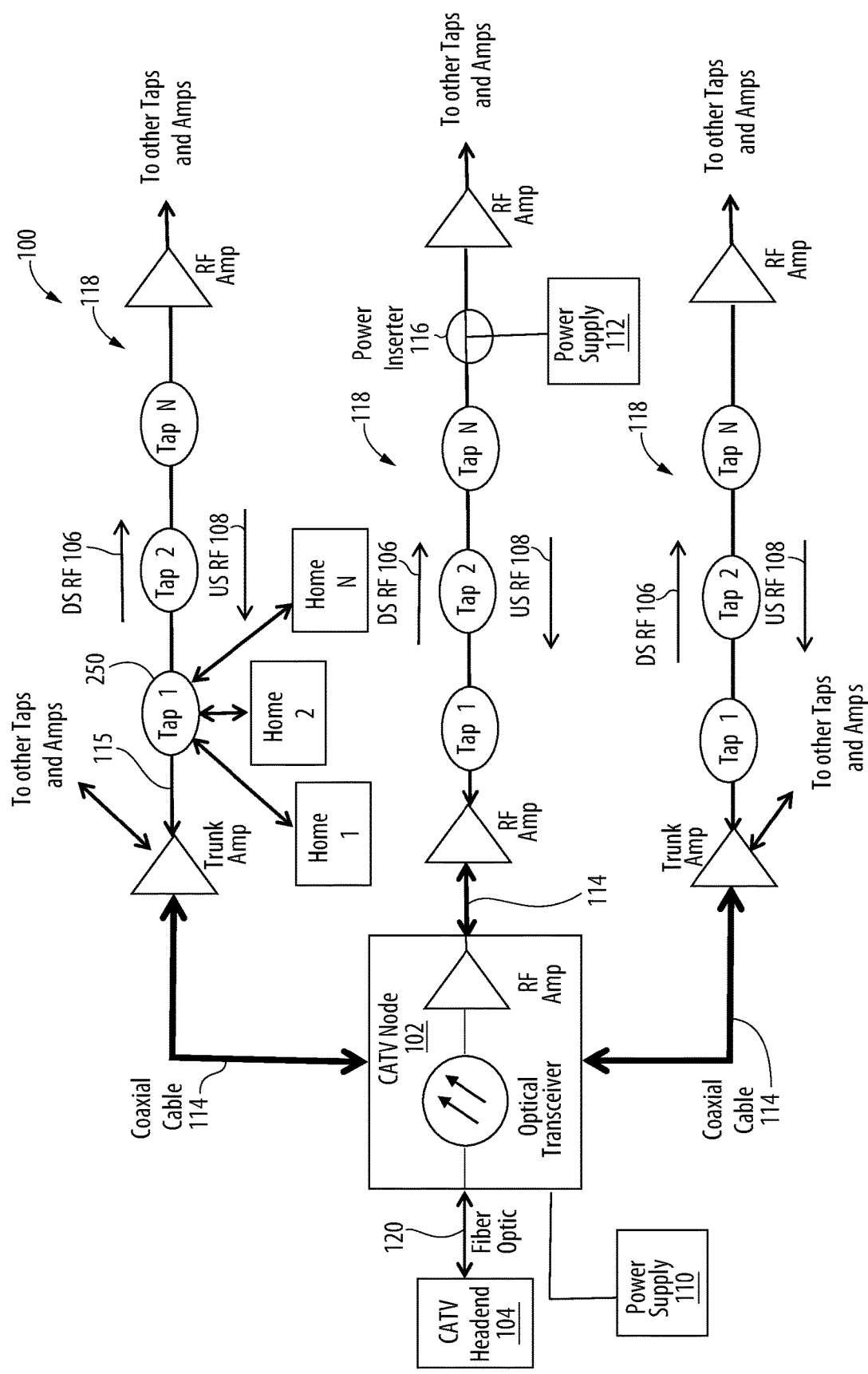
FIG. 1 is a block diagram of a prior art CATV distribution system utilizing a CATV node.

The following description of the preferred embodiment(s) is merely exemplary in nature and is in no way intended to limit the invention or inventions. The description of illustrative embodiments is intended to be read in connection with the accompanying drawings, which are to be considered part of the entire written description. In the description of the exemplary embodiments disclosed herein, any reference to direction or orientation is merely intended for convenience of description and is not intended in any way to limit the scope of the present inventions. Relative terms such as "lower," "upper," "horizontal," "vertical," "above," "below," "up," "down," "left," "right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require a particular orientation unless explicitly indicated as such. Terms such as "attached," "affixed," "connected," "coupled," "interconnected," "secured" and other similar terms refer to a relationship wherein structures are secured or attached to one another either directly or indirectly through intervening structures, as well as both movable or rigid attachments or relationships, unless expressly described otherwise. The discussion herein describes and illustrates some possible non-limiting combinations of features that may exist alone or in other combinations of features. Furthermore, as used herein, the term "or" is to be interpreted as a logical operator that results in true whenever one or more of its operands are true. Furthermore, as used herein, the phrase "based on" is to be interpreted as meaning "based at least in part on," and therefore is not limited to an interpretation of "based entirely on."

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

In the following description, where circuits are shown and described, one of skill in the art will recognize that, for the sake of clarity, not all peripheral circuits or components are shown in the figures or described in the description. Further, the terms "couple" and "operably couple" can refer to a direct or indirect coupling of two components of a circuit.

It is noted that for the sake of clarity and convenience in describing similar components or features, the same or similar reference numbers may be used herein across different embodiments or figures. This is not to imply that the components or features identified by a particular reference number must be identical across each embodiment or figure, but only to suggest that the components or features are similar in general function or identity.

Features of the present inventions may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g., code). Various processors may be embodied in computer and/or server hardware of any suitable type (e.g., desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g., software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs may be referred to as a "programmable device", or "device", and multiple programmable devices in mutual communication may be referred to as a "programmable system." It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g., internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present inventions may be embodied in the form of computer-implemented processes and apparatuses such as processor-based data processing and communication systems or computer systems for practicing those processes. The present inventions may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Prior Art (FIG. 1)

FIG. 1 is a block diagram of a prior art CATV distribution system 100 utilizing a CATV node 102 according to one embodiment. CATV signals generally originate at the CATV headend 104. The CATV signals typically comprise CATV content (TV program channels, movies, music, etc.) and high speed data (Internet/Wi-Fi data, VoIP telephony, etc.), and are usually (though not necessarily) transported in the form of DOCSIS (Data Over Cable Services Interface Specification) signals. From the CATV headend 104 of the exemplified system 100, the CATV signals are transported over two-way fiber optic cable 120 to a CATV node 102. The CATV node comprises an optical transceiver and an RF amplifier, which converts the optical CATV signals to RF CATV signals, generally (although not exclusively) from 5 MHz to 1.0 GHz. The CATV RF signals are then transported on coaxial cable 114 from the CATV node. These CATV signals (both optical and RF) are two-way CATV signals, consisting of both downstream (DS) signals and upstream (US) signals. The downstream RF channels 106 are generally (though not exclusively) from 54 MHz to 1.0 GHz and comprise CATV signals going to the home or business from the CATV node. The upstream RF channels 108 are generally (though not exclusively) from 5 MHz to 42 MHz and consists of the CATV signals going from the home or business to the CATV node. Alternatively, mid split returns (5 MHz to 85 MHz) or high split returns (5 MHz to 204 MHz) may be used for the upstream RF channels.

Also shown in FIG. 1 are power supplies 110, 112 for powering the active devices on a CATV distribution system, which include the node 102 itself, as well as the various amplifiers and other components present in the CATV distribution system 100. These power supplies 110, 112 inject powering signal (AC or otherwise) from the power grid, and insert that power to the CATV distribution system, typically (though not exclusively) as 60 Hz AC power from 60 VAC to 90 VAC, generally with 10 to 20 amps of current. This power is typically transported on the center conductor of the coaxial cable 114 to or through all the components in the CATV distribution system. Power supply 110 injects power directly into the CATV node 102, where the power, in addition to powering the node 102 itself, is in turn fed to other components in the CATV distribution system 100 via the center conductor of the coaxial cable 114 as described above. Power supply 112 may be similar to power supply 100 or it could instead be a power feed from another leg of the CATV distribution system 100 that has excess power. In either case, the power is generally inserted into the CATV distribution system through a power inserter 116 as indicated, which as before, inserts the power onto the center conductor of the CATV distribution system 100. Alternatively, power could be fed directly to one or more amplifiers on the CATV distribution system. Any power supply on the CATV distribution system 100 could also include a redundant (back-up) power supply to improve the reliability of the power on the CATV distribution system 100.

In addition to powering the active devices on the CATV distribution system 100, the power must pass through passive (non-powered) devices on the CATV distribution system 100, such as the taps 250 shown in FIG. 1. These taps allow both the power and RF to be passed through them for other devices in the CATV distribution system. When the budgeted power for the specified components on the CATV distribution system has been consumed, an additional power supply and/or power inserter must be added in that leg of the CATV distribution system 100 requiring power.

While the exemplified CATV node 102 in FIG. 1 is a conventional CATV node, the systems described herein are not limited to conventional nodes. The embodiments discussed herein (including those discussed below) works equally well with more advanced CATV nodes, such as remote Phy (physical layer) nodes (RPHY nodes) and/or remote MAC physical nodes (R MAC PHY nodes). Both RPHY nodes and R MAC PHY nodes are more advanced versions of conventional CATV nodes, in that they move some of the hardware and/or processing software from the CATV headend out to the CATV node, and/or provide it "virtually" in the cloud or otherwise on the CATV network. Furthermore, the advanced nodes could also include full duplex DOCSIS (FDX) functionality and/or expanded bandwidth capability in the form of frequency division duplexing (FDD), both of which provide for additional data/channel capacity on the CATV distribution system. As such, the functionality within the node is becoming increasingly more technically complex, functionally capable, and costly, and will continue to do so for the foreseeable future.

As indicated in FIG. 1, from the CATV node 102, the CATV RF signals (two-way) are transported over coaxial cable to CATV amplifiers, taps, and ultimately to homes and/or businesses via the CATV distribution system. Although only a single node is shown in FIG. 1, any CATV distribution system may include multiple CATV nodes, each of which may be connected to one or more amplifiers (though potentially there could be no amplifiers), each of which will be connected to one or more taps. Each tap services typically between 2 and 8 homes or businesses and from any given amplifier, and there would typically be 4-5 taps until the next amplifier or last home served by the amplifier.

Each CATV node typically (though not exclusively) has one or more RF outputs as indicated in FIG. 1, generally (though not exclusively) outputting approximately +60 dBmv RF output level. In turn, each amplifier can have one or more RF outputs, depending upon the topology of the CATV distribution system. There may also be one or more types of coaxial cable connecting the various components of the CATV distributions system. The heavier coaxial cable 114 is generally of higher performance (i.e., less loss) than the thinner coaxial cable 115 connecting the RF amplifiers to the taps.

To maintain proper signal levels of both the downstream and upstream CATV RF signals 106, 108, each tap in the segment 118 of the CATV distribution system 100 described above from each amplifier (or in the case of no amplifiers, from the node 102) is precisely selected. The number of taps in each segment 118 and the selection of the tap value is determined by a number of factors, including the tap's location from the amplifier, the number of homes served by both the tap and/or amplifier, the node 102 or amplifier's output power level, and the type and distance of the coaxial cable in between. The proper CATV signal level is a balance between having enough signal level to provide adequate signal-to-noise level and therefore signal quality, and not too much signal level which can cause distortion in the amplifier, node 102, or other components in the CATV system. Accordingly, the tap values of taps downstream of the amplifier or node 102 decrease in subsequent value from the amp or node 102 to reduce the downstream signal level coming out of the amp or node 102 to homes served by the respective taps, which is at the highest point directly from the amp or node. The higher the tap value, the less signal that is delivered to the home and the more signal that is also passed on to the next tap, which is desirable to maximize the distance served from the node or amp. A typical string of tap values, from left to right might be, for example, 23 dB, 20 dB, 17 dB, 14 dB, 8 dB and 4 dB, although as mentioned, the number of taps and tap values vary with the criteria described above. As such, generally (though not exclusively), each Tap 1 in each of the three distribution segments 118 in FIG. 1 is a higher tap value than each Tap 2, which are in turn a higher tap value than each Tap N, etc.

Figure 2:
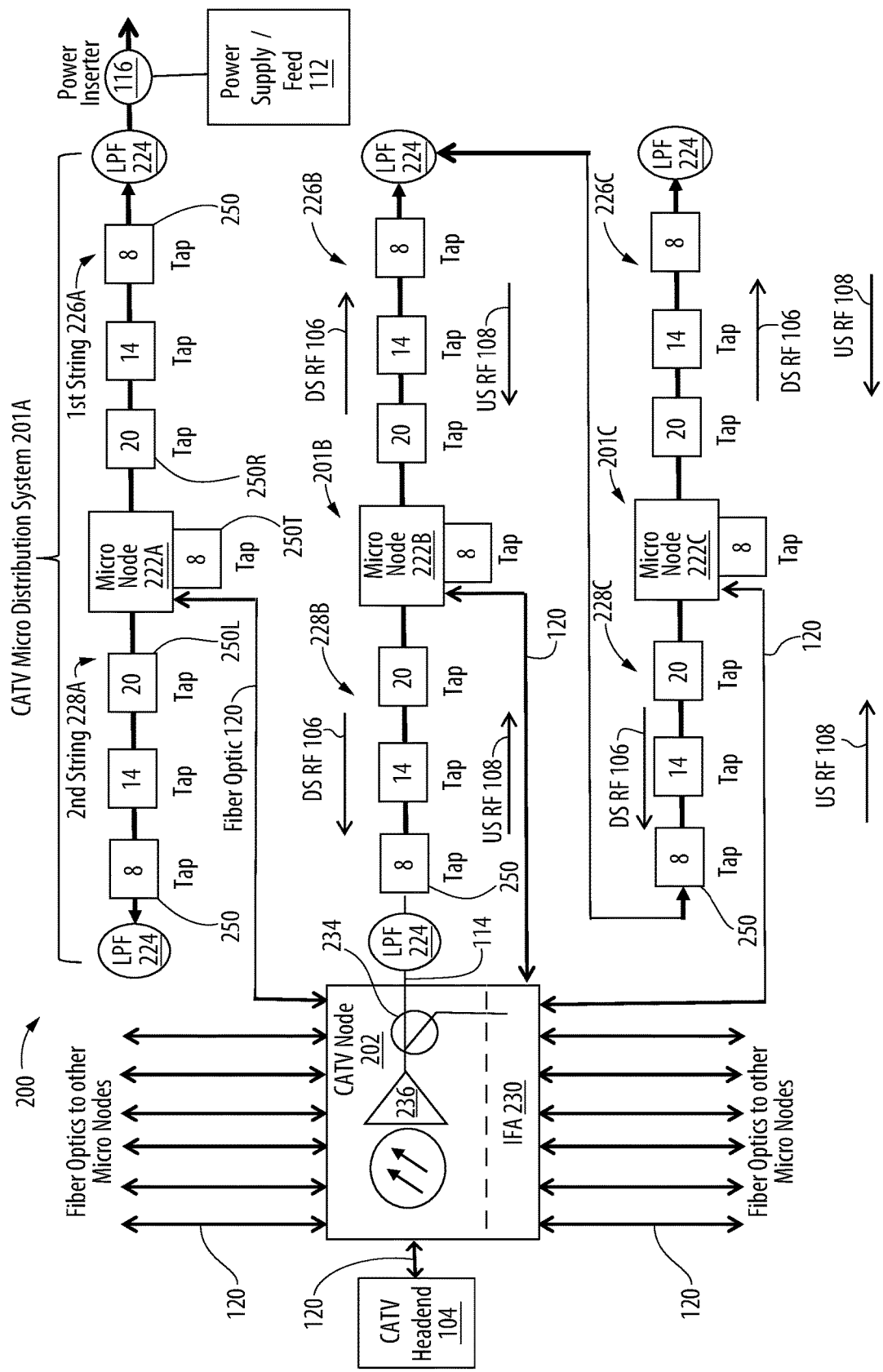
FIG. 2 is a block diagram of an alternative CATV distribution system according to one embodiment, the system utilizing micro distribution systems.

Distributed Access Architecture Using Micro Distribution Systems (FIG. 2)

Referring now to FIG. 2, an alternative CATV distribution system 200 according to one embodiment is disclosed, the system utilizing micro distribution systems 201A, 201B, and 201C (referred to generally as 201). Unlike typical CATV distribution systems such as system 100 in FIG. 1, in the exemplified system 200 of FIG. 2 all amplifiers are eliminated, and the CATV distribution system 200 is repartitioned as a series of one or more very small CATV micro distribution systems 201A, 201B, 201C each comprising a first string of taps 226A, 226B, 226C (referred to generally as 226) and a second string of taps 228A, 228B, 228C (referred to generally as 228) for a total of about 6-8 taps, the taps 250 being independently coupled to a micro node 222A, 222B, 222C (referred to generally as 222). As will be discussed further below, the first and second strings 226, 228 allow signal flow in opposite directions, respectively. The micro node 222 is configured to receive (from the IFA 230 as discussed below) optical CATV signals via a fiber optic cable 120 and to transmit RF signals, along with powering signals, to the strings of taps 226, 228. The powering signals may be provided by at least one of the CATV node 202 and/or a power inserter 116, similar to the methods of providing power discussed with respect to FIG. 1. For example, CATV node 202 may provide, via coaxial cable 114, a powering signal to second string of taps 228B. Further, a powering signal may be provided by power supply 112 and power inserter 116. The powering signal may be an alternating current (AC) powering signal or another type of powering signal.

Each micro distribution system 201 is connected independently to the CATV node 202 and as such operates independently from all the other micro distribution systems 201 serviced by the CATV node 202. The exemplified micro distribution systems 201 are all connected individually with two-way fiber optic cable 120 between the CATV node 202 and individual micro nodes 222 and separated by low pass filters (LPFs) 224 as indicated. The exemplified low pass filters 224 are on either ends of the micro distribution systems 201, the low pass filters 224 being in series with the strings of taps 226, 228 and terminating an end of each string 226, 228 of taps. The low pass filters 224 block the CATV RF signals (both downstream and upstream), but allow the powering signal (e.g., 60-90 VAC 60 Hz) to pass onto the next micro distribution system 201. As such, they would generally (though not exclusively) have a low pass cut off frequency of a few hundred Hertz so that the 60 Hertz power signal would pass through them, but not the CATV signals 5 MHz and above. In certain embodiments, a low pass filter may form part of the taps furthest from the micro node.

FIG. 2 shows only two of the possible configurations of the micro distribution system "building blocks" that could be used to repartition a conventional CATV node. Micro distribution system 201A is a stand-alone micro distribution system. By contrast, micro distribution systems 201B and 201C are connected in series. These systems 201B, 201C operate independently in terms of the CATV RF signals from one another, yet share a common power feed. Further, micro distribution systems 201B and 201C can share an LPF 224 between them in series because the LPF 224 provides the desired filtering described previously in both directions. Parallel combinations of the micro distribution system building blocks are also possible (though not shown in the drawings) such that low pass filters could also be connected to two or more other micro distribution systems in parallel. Any combination of single, series and/or parallel micro distribution systems is possible. In all of these cases, the downstream CATV signals (DS) flow away from the micro nodes 222 and the upstream CATV signals (US) flow toward the micro nodes 222. To the left and right of each micro node 222 are represented 3 taps with possible descending values so indicated as 20 dB, 14 dB, and 8 dB. Further, as shown in FIG. 2, the micro node 222A may comprise a tap 250T.

FIG. 2 also shows the CATV node 202 including an inverse fiber amplifier (IFA) 230. The inverse fiber amplifier 230 may be internal to or external from the CATV node 202. The CATV node 202 receives optical CATV signals via fiber optic cable from the CATV headend 104. An RF amplifier within the CATV node 202 converts the optical CATV signals to RF signals. The inverse fiber amplifier 230 converts the CATV RF signals from the CATV node 202 to optical signals for distribution via two-way fiber to all the micro nodes 222 served by the CATV node 202. In the exemplified embodiment, the inverse fiber amplifier 230 is that sold by Antronix, Inc. The invention, however, is not so limited in other embodiments, the inverse fiber amplifier may be replaced with any device (converter, modulator, etc.) configured to receive CATV RF signals from a CATV node and convert the CATV RF signals to optical signals for distribution via two-way fiber optic cable. In some embodiment, this device is referred to generally as a "first device."

In the case of a more advanced CATV node as described previously (e.g., RPHY nodes), further signal processing may be performed at the CATV node before the signals are forwarded for distribution to the micro nodes by the inverse fiber amplifier. While only 3 micro nodes 222A, 222B, 222C are indicated in FIG. 2, there may be any number of micro nodes that are served by each CATV node.

Figure 3:
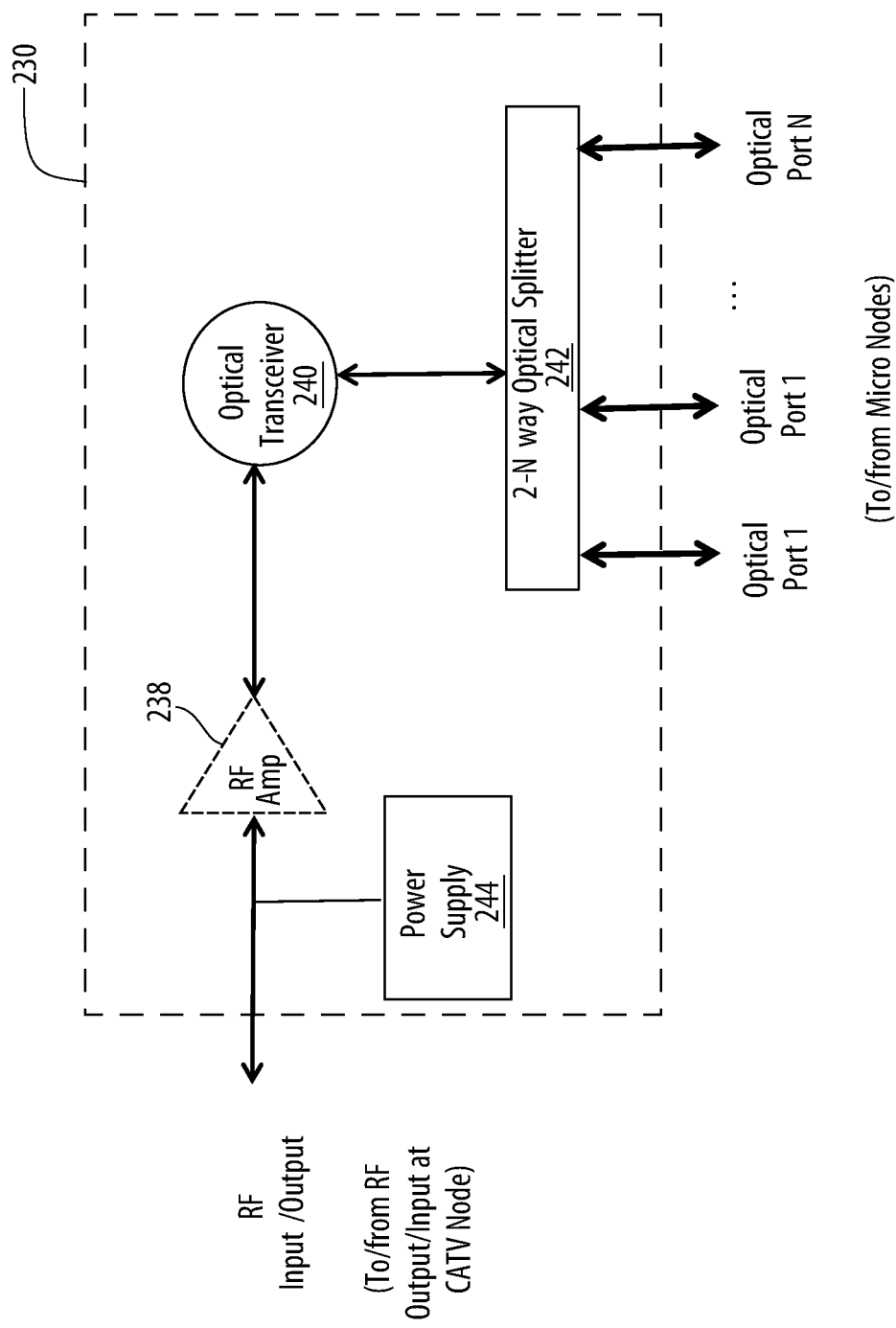
FIG. 3 is a block diagram of an inverse fiber amplifier (IFA) according to one embodiment.

FIG. 3 describes the functionality within the inverse fiber amp 230. The CATV RF signal, which includes both the downstream (DS) and upstream (US) CATV RF signals described previously, is tapped off the CATV node 202. This RF tap off is further detailed in FIG. 2 within the CATV node 202, where an RF coupler 234 is indicated after the amplifier 236 within the CATV node 202. In some CATV nodes there may be two stages of amplifiers present within the amp of the CATV node (not shown), including both a pre-amp and a power amp. The pre-amp provides sufficient amplification after the optical transceiver to provide a good RF signal (in terms of signal-to-noise level) to then forward to the power amp, where the signal is amplified further for distribution within the CATV system. In some of the more advanced CATV node types, some of which were described previously, the point between the pre-amp and the power amp is defined at a point such that the RF signal tap off for the inverse fiber amp could occur at this point. When this point is used to tap off the RF signal to the inverse fiber amp, it could also provide for the elimination of the power amp altogether within the CATV node, and the reduced cost, power, heat and signal distortions associated with the elimination of this power amp in the CATV node. Reducing the output power at the node (as well as eliminating the amplifiers altogether) also reduces the total composite power (TCP) on the CATV network.

Once the RF input and output signals are received into the inverse fiber amp 230, they may optionally need to be amplified and/or conditioned further by amp 238 of the inverse fiber amp 230. The downstream and upstream CATV RF signals are then converted to downstream and upstream optical signals by the optical transceiver 240 generally, although not exclusively, on different wavelengths and/or different fibers (not shown). The optical signals are then connected to an optical splitter 242, which splits the optical signals into up to N separate optical signals for connection via one or more fiber optic cable to the N micro nodes. Also shown in FIG. 3 is a power supply 244 to power the active components within the inverse fiber amp, such as the internal amp and optical transceiver. This power supply could also be external to the inverse fiber amp 230. Lastly, as previously discussed, the inverse fiber amp 230 could be internal or external to the CATV node 202. Likewise, the optical splitter and fiber management of the N fibers (or 2N fibers, if there are separate downstream and upstream fibers to each micro node) could be housed internally within the node and/or IFA, or external to node and/or IFA in a separate enclosure.

Figure 4:
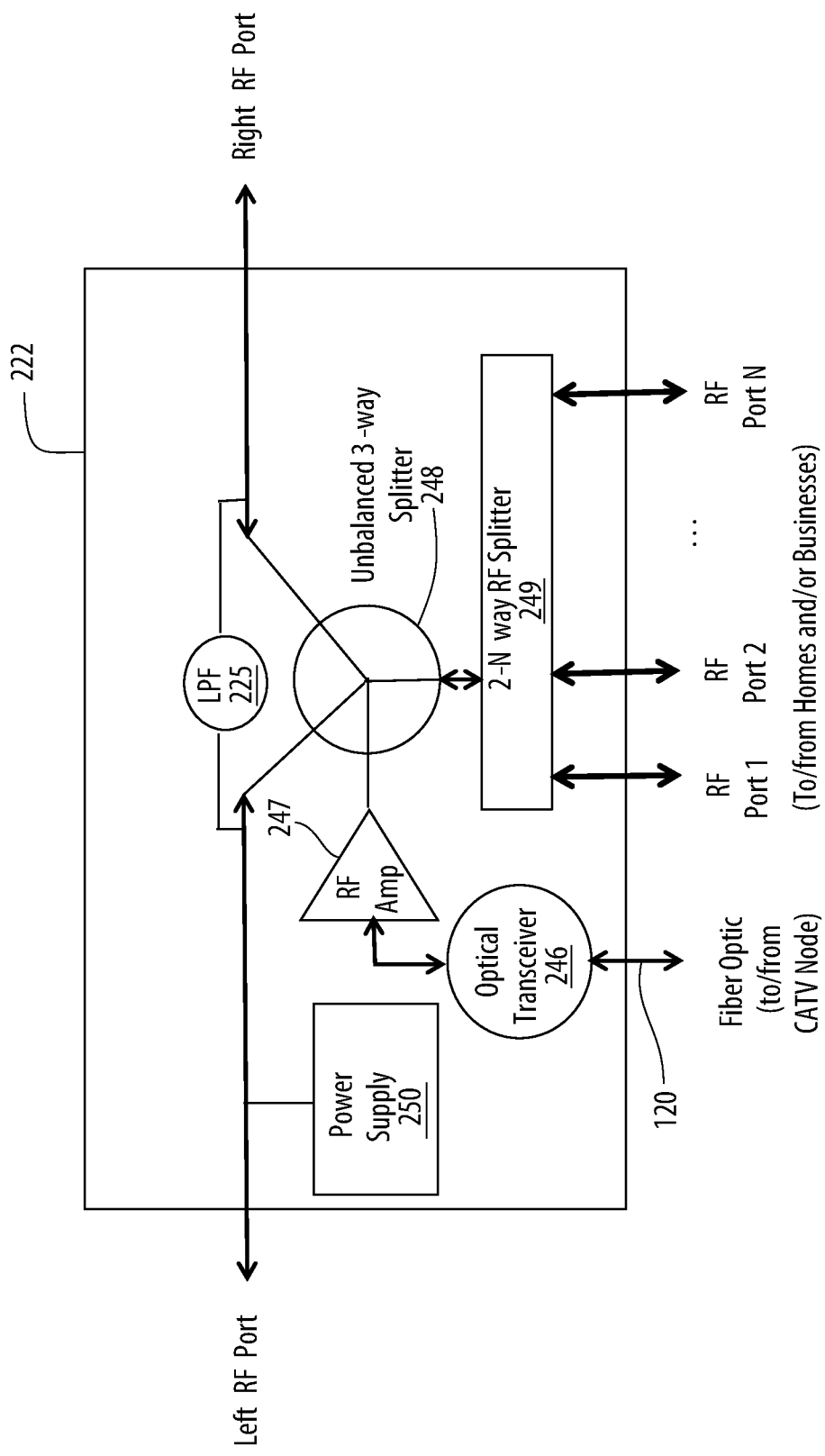
FIG. 4 is a block diagram of a micro node according to one embodiment.

FIG. 4 details the key internal components of the exemplified micro node 222. As discussed above, the optical transceiver 246 within the micro node is connected via two-way fiber to the IFA within (or separate from) the CATV node 202. In the exemplified embodiment, the optical transceiver 246 in the micro nodes 222 uses wavelengths "opposite" relative to the inverse fiber amp 230. In other words, the transmit downstream wavelength of the inverse fiber node is the receive wavelength of the micro node, and the receive upstream wavelength of the inverse fiber amp is the transmit wavelength of the micro node.

The exemplified optical transceiver 246 is connected to a two-way RF amplifier 247, which converts the optical CATV signals to RF CATV signals, in the downstream and upstream RF frequencies as described previously. These downstream and upstream RF frequencies are separated by a diplex filter (not shown), included as part of the optical transceiver 246 or RF amplifier 247. Alternatively, two separate diplex filters could be included before each of the left RF port and right RF port outputs. The RF output level of the RF amp in the proposed invention is typically, although not exclusively approximately +48 dBmv, or potentially (and/or optionally) higher, depending upon the desired upper frequency range of the CATV network. This RF signal is then connected to an RF splitter 248, typically, although not exclusively an unbalanced 3-way RF splitter. The two balanced (equal and generally higher) RF outputs are connected to the left RF port and right RF port, and the unbalanced (unequal and generally lower) RF output is connected to an RF splitter 249, with typically between 2 and "N" RF output ports. These N RF ports are in turn connected to between 2 and N homes and/or businesses. It should be noted that the CATV RF tap functionality within FIG. 4 (i.e., the 2-N way RF splitter and associated RF ports) could be removed from the micro node and either eliminated altogether or provided as another tap on either side of the micro node, with the micro node then providing all the other functionality described above.

The optical transceiver 246 of the exemplified micro node 222 may also include some form of optical beat interference (OBI) mitigation. This OBI mitigation reduces any interference that might result from the optical transceiver in the micro node from trying to communicate with the inverse fiber amplifier from simultaneous homes or businesses served by that micro node. A wide variety of OBI mitigation techniques could be employed within the micro node.

The exemplified micro node 222 also includes the same or similar low pass filter 225 as the low pass filter 224 in FIG. 2, which passes the (typically) 60-90 VAC 60 Hz power on the order of 10-20 amps through the micro node 222 and onto the left RF port or right RF port, on the side opposite from where the AC power originated. The low pass filter 225 also provides for RF isolation between the left and right RF ports. FIG. 4 also includes a power supply 245, which taps off some of the aforementioned power to provide power to the optical transceiver 246, RF amp 247, and any other active components within the micro node 222, such as status monitoring (not shown), which communicates status information about the micro node's technical status to a centralized location (also not shown) for troubleshooting, reconfiguration, etc.

Figure 5:
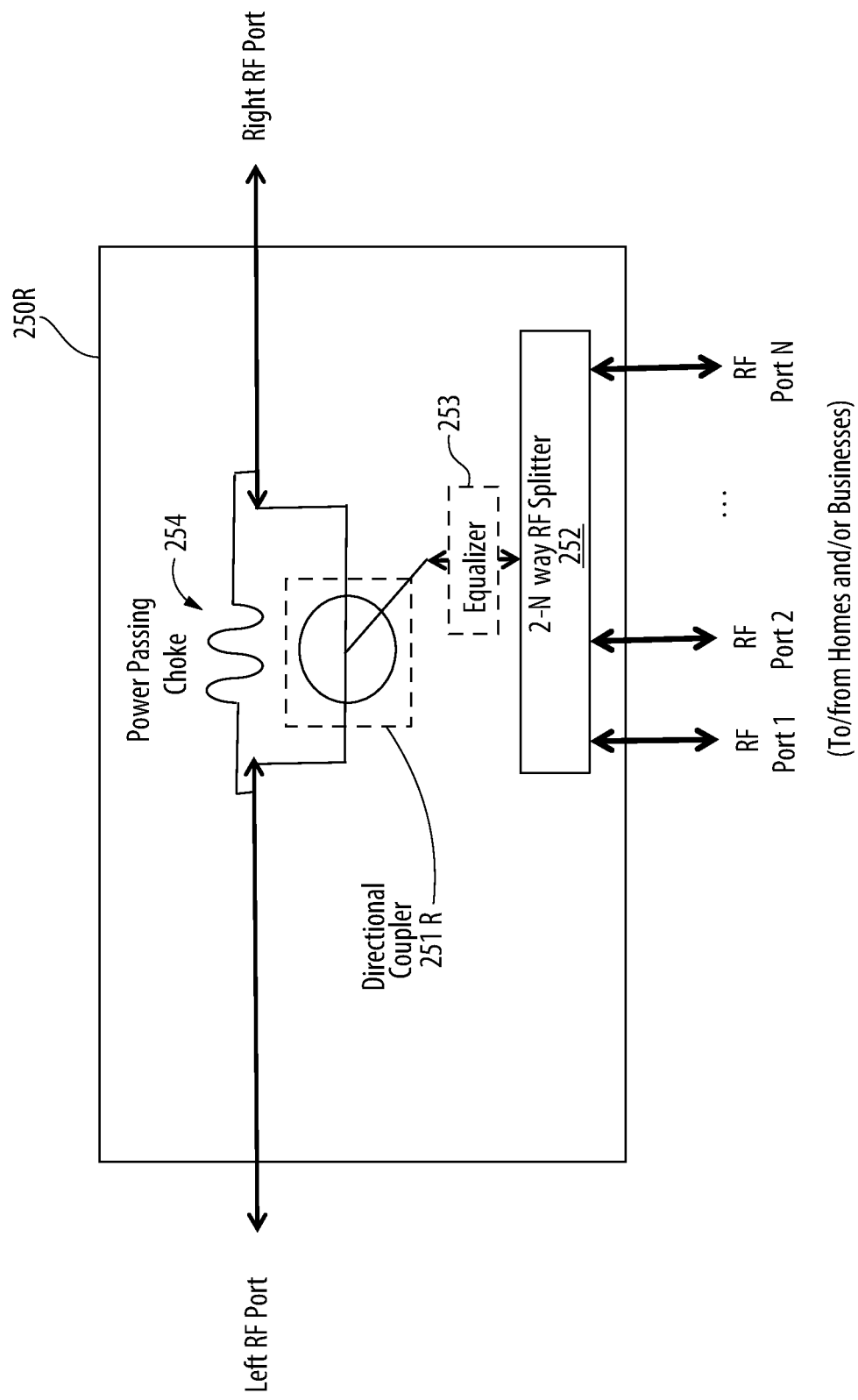
FIG. 5 is a block diagram of a tap of a first string of taps of the micro distribution system according to one embodiment.

FIG. 5 shows the main components within the taps 250R of the first string 226 of taps that are on the right side of the exemplified micro nodes 222. With respect to the figures, these taps 250R of the first string 226 are configured to pass the RF signals in a rightward direction, which may be referred to more generally as a "first direction." Included in these exemplified taps 250R is a directional coupler 251R that "couples off" a portion of the CATV RF signal that comes from the left RF port in FIG. 5. This portion of the CATV RF signal that is coupled off then goes to a splitter 252, that divides the CATV RF signal between the RF Port 1 through RF Port N. These RF Ports (1 to N) are in turn connected to between 1 and N homes or businesses, which is typically although not exclusively is between 2 to 8 homes or businesses. An optional equalizer 253 is also indicated in FIG. 5 between the directional coupler 251R and the splitter 252, to provide additional signal conditioning, such as tilt, filtering, etc. Also included in tap 250R is a power passing choke 254, which allows the powering signal (typically, although not exclusively, 60-90 VAC) to pass from one side of the tap 250R to the other.

Figure 6:
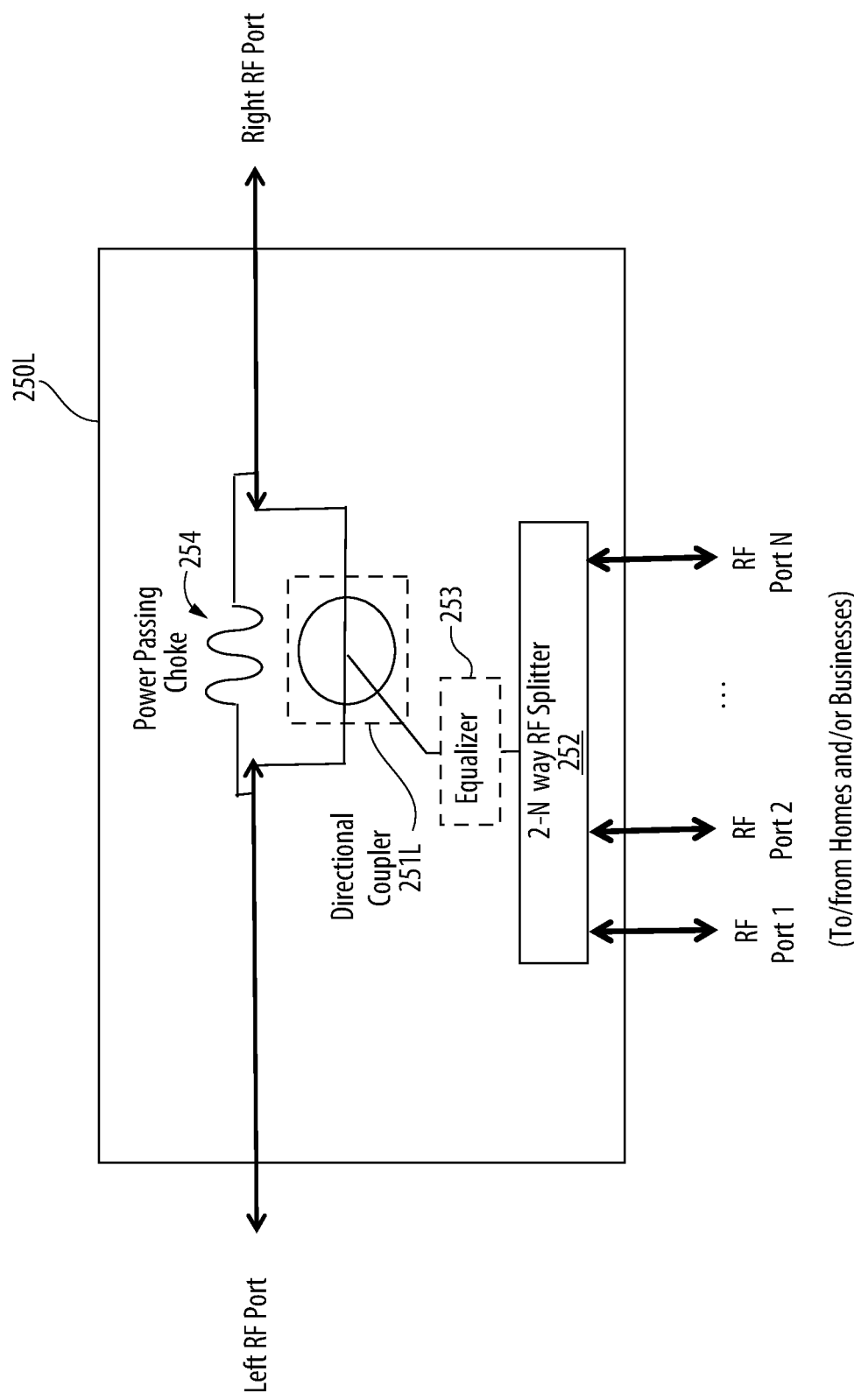
FIG. 6 is a block diagram of a tap of a second string of taps of the micro distribution system according to one embodiment.

FIG. 6 shows the main components within the taps 250L of the second string of taps 228 that are on the left side of the exemplified micro nodes 222. The exemplified tap 250L is identical to tap 250R of FIG. 5 on the right side of the micro node 22, except that the directional coupler 251L is reversed relative to FIG. 5. As such, the CATV RF signals from the micro node 222 flow from the right RF port to the left RF port, and feed the homes and businesses served from RF ports 1 to RF ports N via the 2-N way RF splitter 252. Thus, with respect to the figures, taps 250L of the second string 228 are configured to pass the RF signals in a leftward direction, which may be referred to more generally as a "second direction" opposite the first direction.

If the directional coupler 251L is "interchangeable" (i.e., the input and output can be switched with the coupling leg staying the same), then the left side tap 250L in FIG. 6 can be converted to the right side tap 250R of FIG. 5 by switching such input and output of the directional coupler, to minimize tap values and types, and therefore inventory types.

Figure 7:
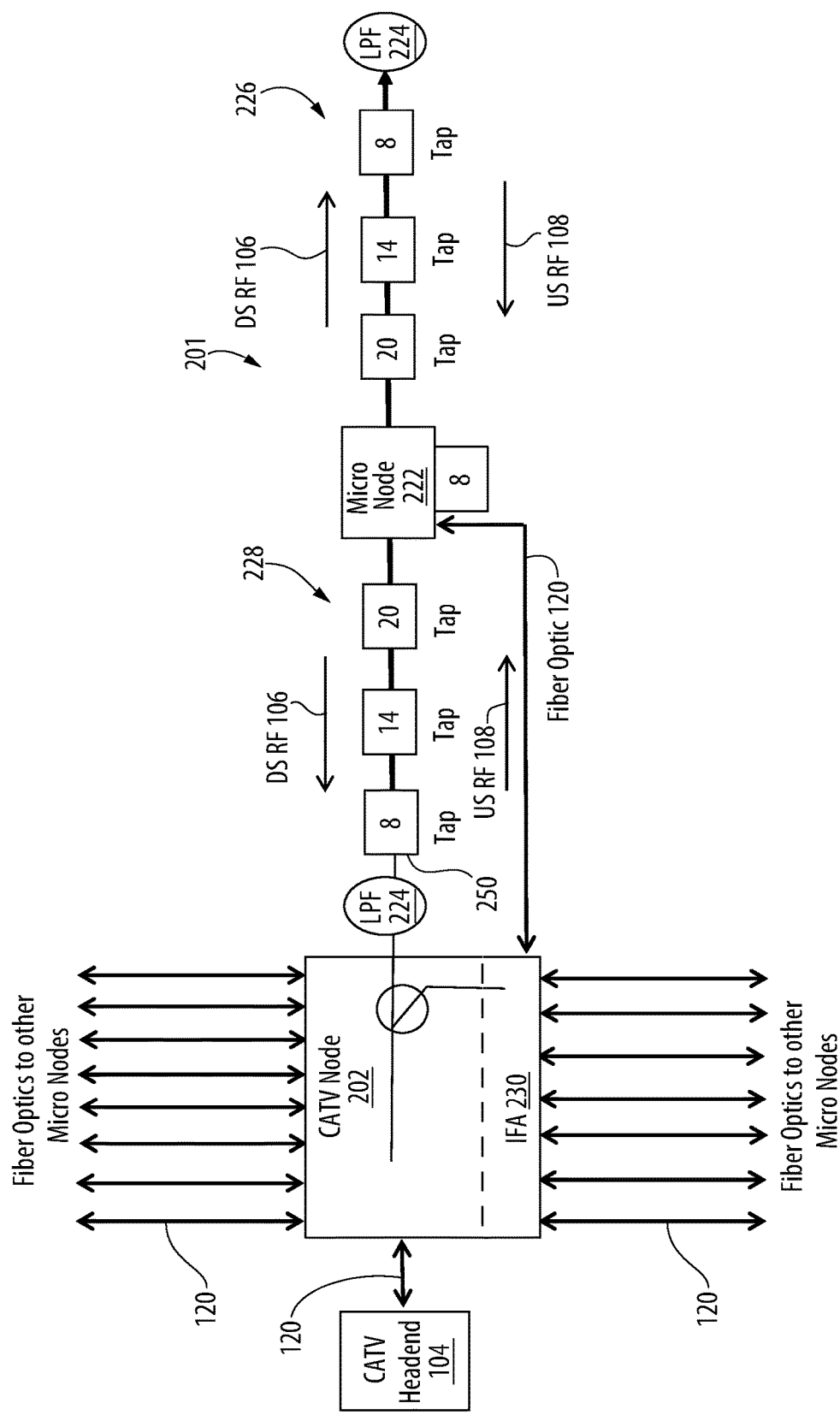
FIG. 7 is a block diagram of a micro distribution system without CATV node-fed taps according to one embodiment.
Figure 8:
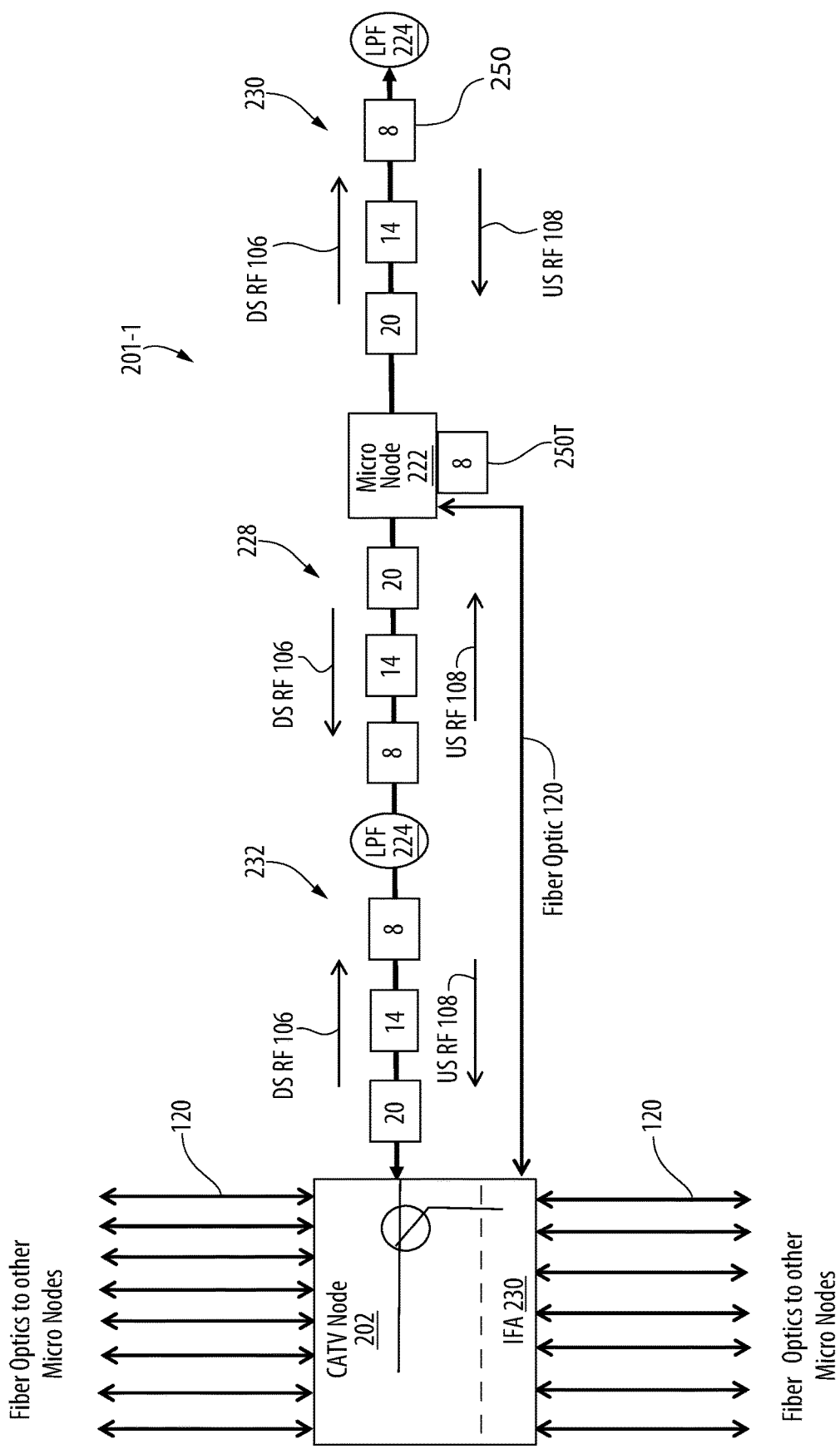
FIG. 8 is a block diagram of a micro distribution system with CATV node-fed taps according to one embodiment.

FIG. 7 shows a portion of FIG. 2, highlighting one particular CATV micro distribution system 201. FIG. 8 details the same CATV micro distribution system as in FIG. 7, except that the system 201-1 of FIG. 8 also includes a third string of taps 232 which is fed directly from the CATV node 202 itself, rather than from a fiber optic cable 120 and micro node 222. As such, the RF signal and powering signal for that string 232, as indicated by the three taps directly connected to the CATV node 202, is derived from and connected directly to the CATV node 202 as shown in FIG. 8. The third string 232 is coupled between the CATV node and the second string 228. While only 3 taps are show in the third string 232, the invention is not so limited as the string could include more or less than 3 taps directly connected to the CATV node via RF. As in previously discussed CATV micro distribution system segments, the third string 232 of the CATV micro distribution system is further connected to other strings 228, 230 of the CATV micro distribution system 201-1 via a LPF 224 to pass along the powering signal yet block the CATV RF signals.

Those skilled in the art will appreciate that the CATV micro distribution system "building blocks" described in FIG. 8, FIG. 7 and FIG. 2 can all be arranged in a wide variety of configurations, including but not limited to individual, series and/or parallel configurations. Additionally, the CATV micro distribution system building block detailed in FIG. 8 could have its RF signals fed off an amplifier rather than a CATV node as detailed in FIG. 8.

Figure 9:
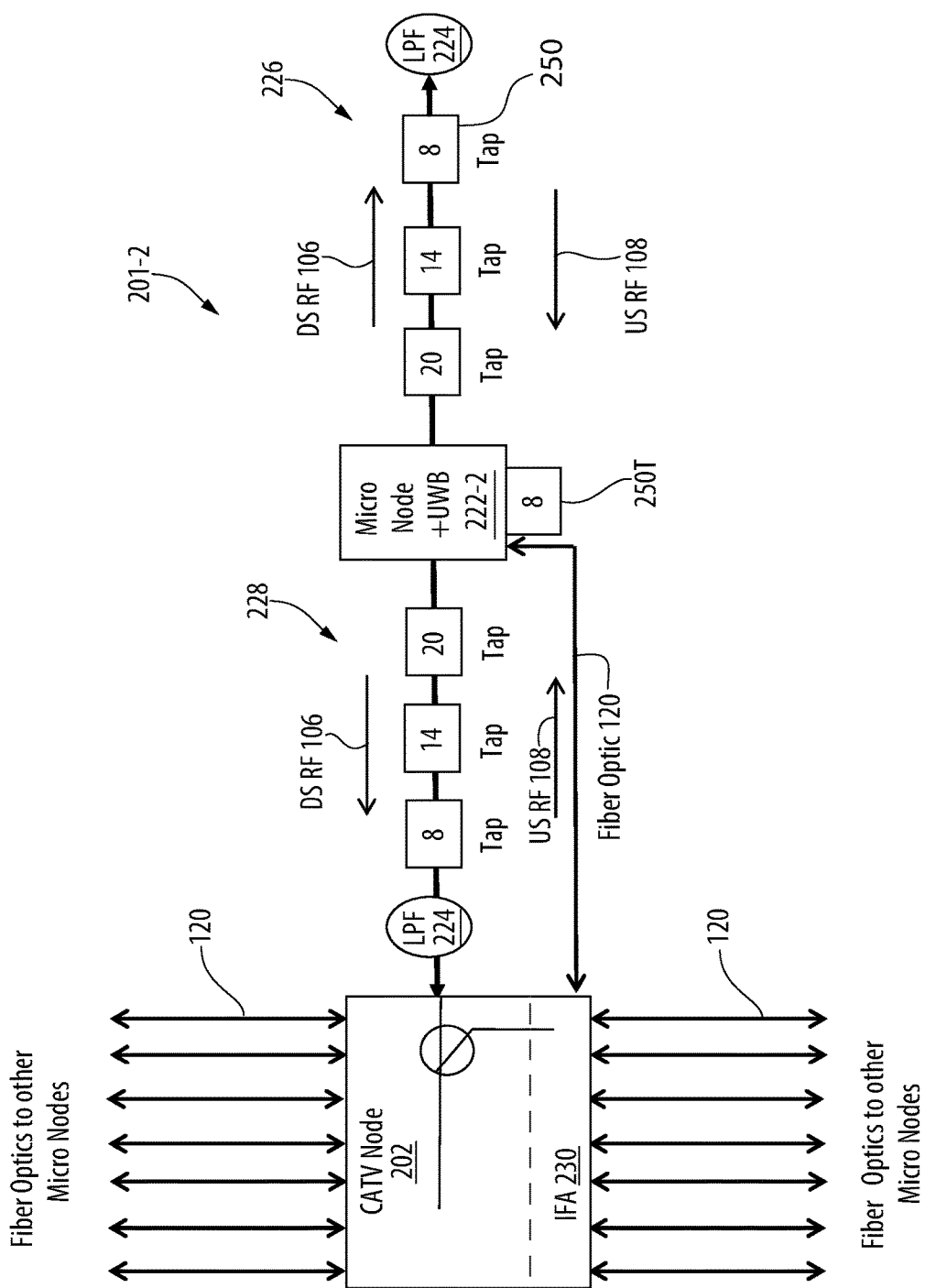
FIG. 9 is a block diagram of a micro distribution system where the micro node includes ultra-wideband (UWB) functionality according to one embodiment.

FIG. 9 indicates a CATV micro distribution system that is similar to FIG. 7, except that it includes ultra-wideband (UWB) functionality within it. The UWB functionality provides for additional data communications available from the micro node 222-2, generally although not exclusively by injecting additional data capacity into the micro node and modulating this additional data capacity at RF frequencies above the conventional CATV RF spectrum, such as above 1.0 GHz, 1.2 GHz or even 1.8 GHz to provide and deliver this additional data capacity to the homes or businesses. UWB generally, although not exclusively operates from approximately 1.8 GHz to 3.1 GHz with low modulation order (QPSK, as but one example) to deliver the additional data capacity, generally, although not exclusively at 1-10 Gbps data rates.

Figure 10:
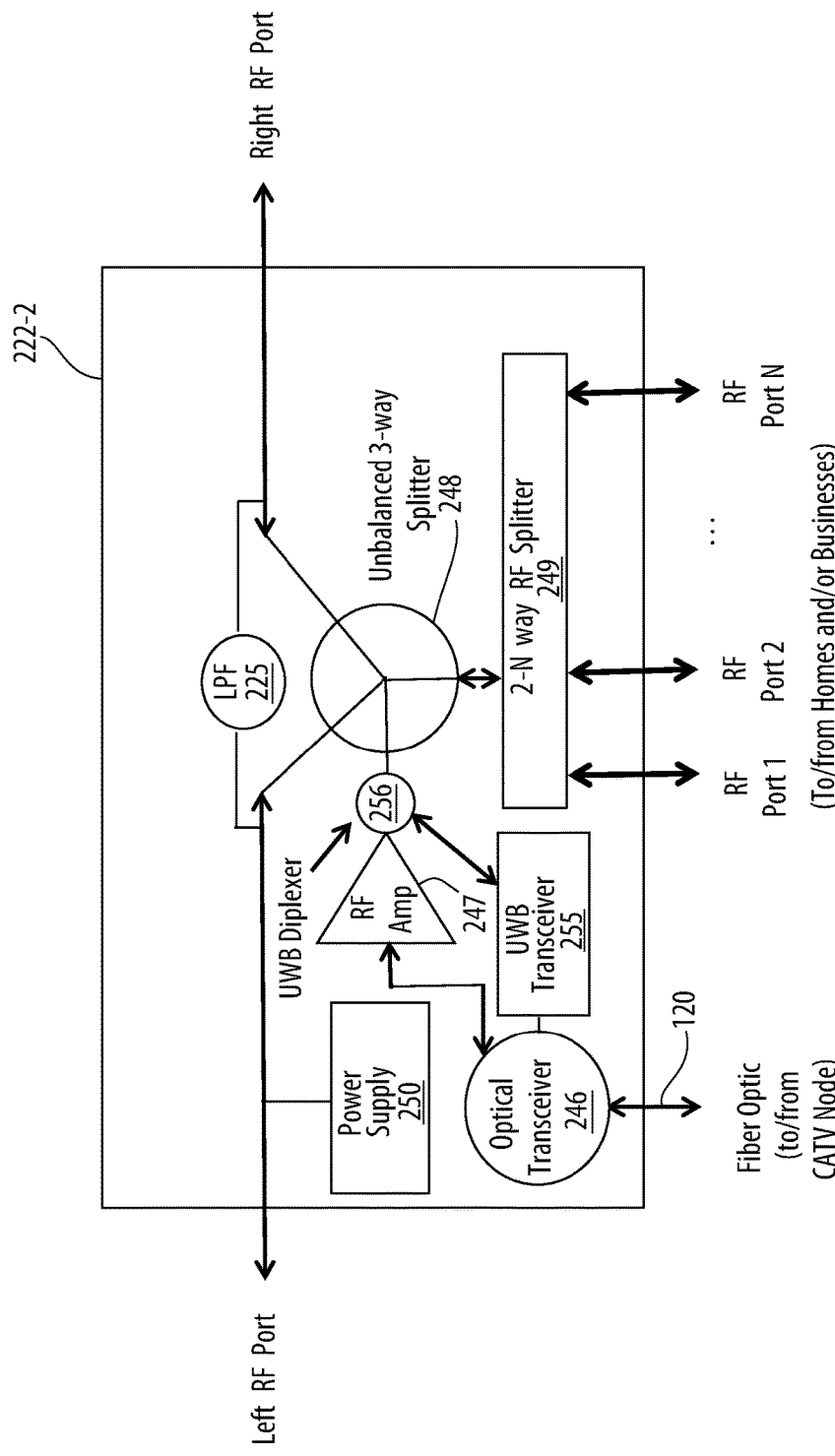
FIG. 10 is a block diagram of micro node including UWB functionality according to one embodiment.

FIG. 10 indicates the functionality included in the UWB-capable micro node 222-2. It is similar to the micro node 222 in FIG. 4 except it includes the UWB functionality described above. The additional data capacity is provided by the same optical transceiver 246 or a separate optical transceiver (separate not shown), which is in turn connected to the UWB transceiver 255. This additional data capacity could be transported on the same fiber optic cable as indicated to/from the CATV node to the UWB micro node via different downstream and upstream wavelengths, or it could be provided by a separate fiber optic cable (not shown). The exemplified UWB transceiver 255 converts (modulates/demodulates) this additional data capacity to the UWB frequencies described above and then diplexes (combines) these UWB frequencies together with the CATV RF frequencies previously described in the UWB diplexer 256, which are then split and forwarded together with the CATV RF frequencies to the left RF Port, the right RF Port and the 2-N way RF splitter 249 to the homes and businesses. It should be noted that as detailed above in FIG. 4, the CATV RF tap functionality within FIG. 10 (i.e., the 2-N way RF splitter 249 and associated RF ports) could be removed from the micro node 222-2 and either eliminated altogether or provided as another tap on either side of the micro node 222-2, with the micro node then providing all the other functionality described above.

Figure 11:
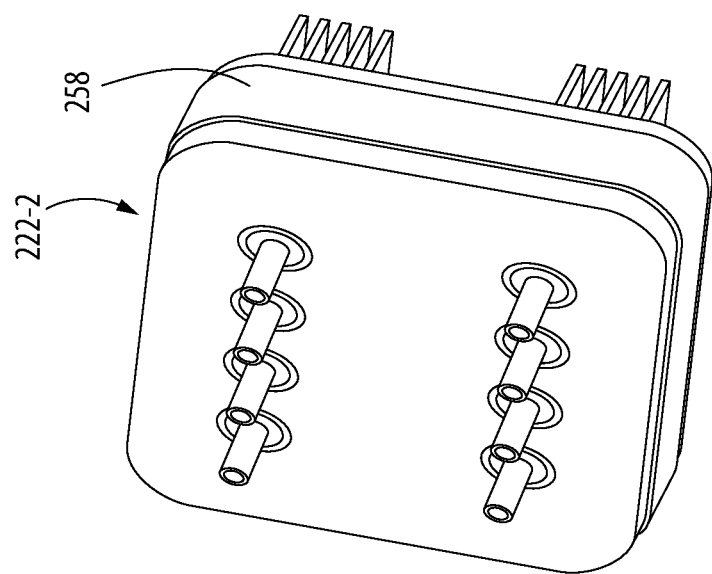
FIG. 11 is a perspective view of a micro node without and with UWB functionality according to one embodiment.
Figure 11:
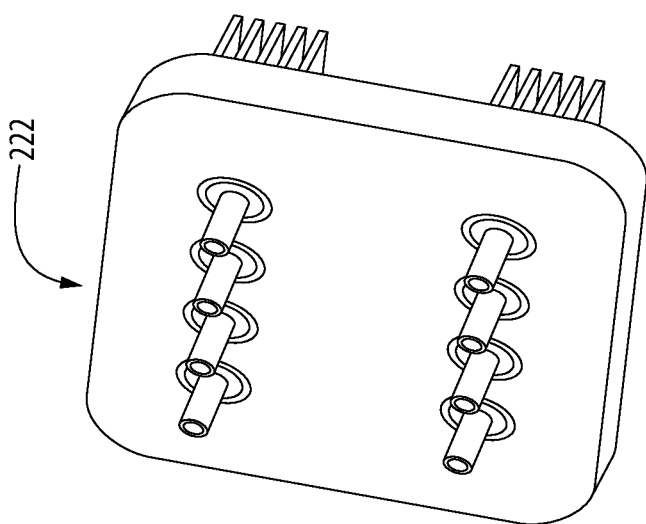

The UWB functionality detailed in FIGS. 9 and 10 could be functionally added to the micro node 222 in FIG. 4, such that it could be optionally added during either the manufacturing process, or once the product is deployed in the field. A wide variety of methods for including this optional UWB functionality are envisioned, including, but not limited to plugin modules or PCB's into the micro node (not shown), or adding an entire UWB section 258 to the micro node, possibly as shown in the micro node 222-2 of FIG. 11. This is but one way the UWB functionality could be added, including a micro node both without and with UWB functionality.

The foregoing embodiments provide several advantages. First, they enable the elimination of all amplifiers within a CATV system, reducing CATV system power and improving reliability, signal quality, including BER (bit error rates) and total composite distortion. Further, the embodiments reduce CATV system RF Levels, improving signal quality, including BER (bit error rates) and total composite distortion and reduced CATV system leakage. Further, the embodiments enable compatibility with any future CATV node improvements and bandwidth enhancements, as all the improvements and enhancements are leveraged by the micro nodes. Further, the embodiments provide bandwidth increases on the CATV network that are more easily facilitated technically, as there are less taps in each segment (3 on either side of the micro node) through which the CATV signal has to traverse, versus 4-6 taps typically in existing CATV network segments between amplifiers. Further, they enable reduction in the tap values necessary to construct a CATV system to potentially only 3 tap values. Further, the embodiments enable upgrading taps to facilitate the system implementation that can be accomplished with replacing faceplates only, without replacing or splicing taps within the CATV network. Further, the embodiments enable improved surge, lightning, and noise performance by virtue of the required distributed low pass filters. Further, they are compatible with all node types and not just advanced node types. Further, the embodiments enable improved performance and compatibility as a result of the reduced RF level operating ranges. Further, they provide an easy migration strategy, as the embodiments can be implemented on a gradual basis within a CATV node and/or a CATV system. Further, they enable reduced and more efficiently distributed power utilization within a CATV distribution system. Finally, the embodiments provide a convenient platform for optionally adding supplemental data capacity to a CATV distribution system via UWB modulation.

While the inventions have been described with respect to specific examples including presently preferred modes of carrying out the inventions, those skilled in the art will appreciate that there are numerous variations and permutations of the above described systems and techniques. It is to be understood that other embodiments may be utilized and structural and functional modifications may be made without departing from the scope of the present inventions. Thus, the spirit and scope of the inventions should be construed broadly as set forth in the appended claims.

What is claimed is:

1. A system comprising:
   a) a first device configured to:
      i) receive, from a cable television (CATV) node, first downstream CATV RF signals, and convert the first downstream CATV RF signals to downstream optical signals;
      ii) receive upstream optical signals, and convert the upstream optical signals to first upstream CATV RF signals;
      iii) wherein the downstream optical signals are distributed separately from the upstream optical signals by using at least one of different fiber optic cables or different wavelengths;
   b) a first micro distribution system and a second micro distribution system, each of the micro distribution systems being independently operably coupled to the first device and comprising:
      i) a micro node configured to:
         1) receive the downstream optical signals, directly or indirectly, from the first device, and convert the downstream optical signals to second downstream CATV RF signals;
         2) receive second upstream CATV RF signals, and convert the second upstream CATV RF signals to the upstream optical signals received by the first device;
      ii) at least one string of taps operably coupled to the micro node and configured to:
         1) receive the second downstream CATV RF signals, directly or indirectly, from the micro node;
         2) passing the second upstream CATV RF signals, directly or indirectly, to the micro node; and
         3) receive a powering signal;
         4) wherein each of the at least one string of taps comprises taps and is terminated at an end of the string by a low pass filter (LPF);
      iii) wherein, for each of the at least one string of taps:
         1) the second downstream CATV RF signals are passed from the micro node along the taps and blocked by the LPF;
         2) the second upstream CATV RF signals are passed along the taps to the micro node; and 3) the powering signal is passed along the taps and through the LPF; and iv) wherein the LPF of one of the strings of taps of the at least one string of taps of the first micro distribution system passes the powering signal to the second micro distribution system.

2. The system of claim 1 wherein the first downstream CATV RF signals are the same as the second downstream CATV RF signals, and the first upstream CATV RF signals are the same as the second upstream CATV RF signals.

3. The system of claim 1 wherein the micro node is configured to receive the downstream optical signals from, and transmit the upstream optical signals to, an optical splitter and fiber management housed in an enclosure separate from the CATV node and the first device, the optical splitter and fiber management receiving the downstream optical signals from, and transmitting the upstream optical signals to, the first device.

4. The system of claim 3 wherein the optical splitter and fiber management enclosure distributes the downstream optical signals to the micro node separate from the upstream optical signals by using different cables or different wavelengths.

5. The system of claim 4 further comprising optical beat interference mitigation.

6. The system of claim 1 wherein the first device comprises an inverse fiber amplifier.

7. The system of claim 1 wherein the first device forms part of the CATV node.

8. The system of claim 1 wherein the LPF forms part of a tap of a string of taps of the at least one string of taps that is furthest from the micro node.

9. The system of claim 1 wherein at least one of the micro nodes comprises a tap.

10. The system of claim 1:
wherein the at least one string of taps comprises a first string of taps and second string of taps;
wherein the micro node comprises:
a first RF port coupling the first string of taps to the micro node;
a second RF port coupling the second string of taps to the micro node;
an internal LPF separate and distinct from the LPF of each of the at least one string of taps, the internal LPF providing RF isolation between the first RF port and the second RF port while allowing the power signal to pass through the micro node.

11. The system of claim 1 wherein the CATV node has full duplex DOCSIS (FDX) functionality.

12. A method comprising:
a) at a first device, receiving, from a cable television (CATV) node, first downstream CATV RF signals, and converting the first downstream CATV RF signals to downstream optical signals;
b) at the first device, receiving upstream optical signals, and converting the upstream optical signals to first upstream CATV RF signals, wherein the downstream optical signals are distributed separately from the upstream optical signals by using at least one of different fiber optic cables or different wavelengths;
c) operably coupling a first micro distribution system and a second micro distribution system to the first device, each of the micro distribution systems comprising a micro node and at least one string of taps operably coupled to the micro node;
d) at the micro node, receiving the downstream optical signals, directly or indirectly, from the first device, and converting the downstream optical signals to second downstream CATV RF signals;
e) at the micro node, receiving second upstream CATV RF signals, and converting the second upstream CATV RF signals to the upstream optical signals received by the first device;
f) at the at least one string of taps:
i) receiving the second downstream CATV RF signals, directly or indirectly, from the micro node;
ii) passing the second upstream CATV RF signals, directly or indirectly, to the micro node; and
iii) receiving a powering signal;
iv) wherein each of the at least one string of taps comprises taps and is terminated at an end of the string by a low pass filter (LPF);
g) for each of the at least one string of taps:
i) passing the second downstream CATV RF signals from the micro node along the taps, the LPF blocking the second downstream CATV RF signals;
ii) passing the second upstream CATV RF signals along the taps to the micro node; and
iii) passing the powering signal passed along the taps and through the LPF;
iv) wherein the LPF of one of the strings of taps of the at least one string of taps of the first micro distribution system passes the powering signal to the second micro distribution system.

13. The method of claim 12 wherein the first downstream CATV RF signals are the same as the second downstream CATV RF signals, and the first upstream CATV RF signals are the same as the second upstream CATV RF signals.

14. The method of claim 12 wherein the micro node is configured to receive the downstream optical signals from, and transmit the upstream optical signals to, an optical splitter and fiber management housed in an enclosure separate from the CATV node and the first device, the optical splitter and fiber management receiving the downstream optical signals from, and transmitting the upstream optical signals to, the first device.

15. The method of claim 14 wherein the optical splitter and fiber management enclosure distributes the downstream optical signals to the micro node separate from the upstream optical signals by using different cables or different wavelengths.

16. The method of claim 15 further comprising optical beat interference mitigation.

17. The method of claim 12 wherein the first device comprises an inverse fiber amplifier.

18. The method of claim 12 wherein the first device forms part of the CATV node.

19. The method of claim 12:
wherein the at least one string of taps comprises a first string of taps and second string of taps;
wherein the micro node comprises:
a first RF port coupling the first string of taps to the micro node;
a second RF port coupling the second string of taps to the micro node;
an internal LPF separate and distinct from the LPF of each of the at least one string of taps, the internal LPF providing RF isolation between the first RF port and the second RF port while allowing the power signal to pass through the micro node.

20. The method of claim 12 wherein the CATV node has full duplex DOCSIS (FDX) functionality.

* * * * *